United States Patent [19]

Ducret

[11] Patent Number: 4,683,350

[45] Date of Patent: Jul. 28, 1987

[54] BUSHING FOR BX CABLE

[76] Inventor: Lucien C. Ducret, 9 Tod's Driftway, Old Greenwich, Conn. 06870

[21] Appl. No.: 922,061

[22] Filed: Oct. 22, 1986

[51] Int. Cl.⁴ ............................................. H01B 17/58
[52] U.S. Cl. ............................................ 174/83; 16/2
[58] Field of Search ................ 174/83, 152 G, 153 G; 16/2, 3, 108; 138/96 R, 96 T

[56] References Cited

U.S. PATENT DOCUMENTS

| 947,185 | 1/1910 | McBean | 174/153 G |
| 1,808,542 | 6/1931 | Ginsburg | 174/83 |
| 1,842,216 | 1/1932 | Thomas, Jr. | 174/83 X |

Primary Examiner—Laramie E. Askin
Attorney, Agent, or Firm—DeLio & Associates

[57] ABSTRACT

A protective bushing adapted to fit in a cut end of armored cable of the BX type, shaped and contoured to prevent contact of wires in the cable with any sharp edges or points adjacent to the cut end of the armor.

14 Claims, 10 Drawing Figures

BUSHING FOR BX CABLE

BACKGROUND OF THE INVENTION

This invention relates to a protective bushing adapted for use in a cut end of a BX armored cable or the like.

When a piece of BX cable, of normal configuration is cut, as by means of a hand or power cutting tool, on a path parallel to the longitudinal axis of the cable, the cut end presents inner and outer, helically disposed, rather sharp edges adjacent to the straight cut edge. A cable cutter adapted to make such a cut, which is clean and has no ragged edges, is disclosed in Ducret U.S. Pat. No. 3,851,387, which tool was introduced in 1973 under the trademark "ROTO-SPLIT" and has since won wide acceptance.

A BX cable, in normal use, contains and protects one or more insulated wires which protrude from the cut end of the cable (however the cut may have been made) for connection to any suitable electric device, appliances, tools or circuit elements. Each insulated wire exiting from the cut end of the cable and led in a direction which departs from the cable axis necessarily has its insulation pressed against the inner edge of the cut end of the cable, and damage to the insulation frequently ensues as a result of friction and/or pressure at the point of contact.

Installation of insulating bushings between the wires and the armor was required when it was found that chafing could occur and could be a potential cause of "shorts". Simple, known, bushings, identified as "Red Heads", are not designed to match the spiral of the BX in a parallel cut end. They are made of thin plastic material and many times they do not cover the full internal circumference of the armor. This condition is potentially dangerous since the wires could still come in contact with a sharp edge of the armor and possibly damage the insulation.

It is accordingly an object of the present invention to provide a bushing of durable plastic material (or the like) which is so positioned in the cut end of the cable that all sharp edges which might damage the insulation on the wire or wires, are covered and prevented from contacting any insulation surface.

It is a further object of the invention to provide a safe insulating bushing with a construction intended to fill completely the gap between the BX armor previously cut with the "Roto-Split" cutter (hereinafter referred to as "parallel cut") and a theoretical square cut end of the cable. The new bushing, preferably, has an overlapping portion which can be squeezed to fit different internal diameters. This feature provides full insulation over the complete circumference.

The bushing of this invention is of molded insulating material, solid or split and overlapped, formed as a sleeve which shields the wires in a BX cable from contact with the cable armor at or near a cut end of such cable, particularly a cable end which has been cut in a plane parallel to the axis of the cable.

BRIEF DESCRIPTION OF THE DRAWINGS

A practical embodiment of the invention is shown in the accompanying drawings wherein.

DETAILED DESCRIPTION OF THE PREFERRED EMBODIMENT

Figure 1:
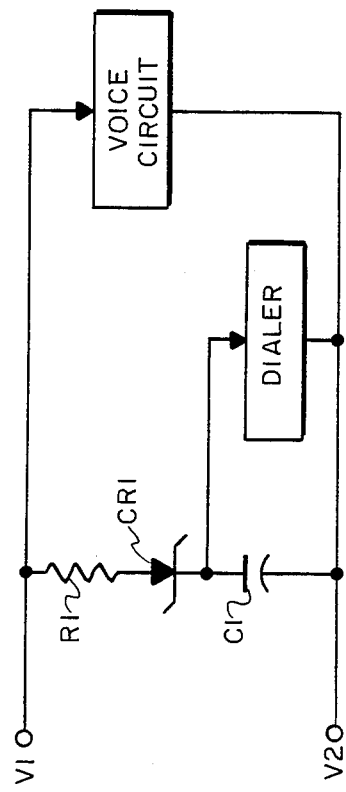
FIG. 1 represents an orthographic projection of the previously used bushing.
Figure 2:
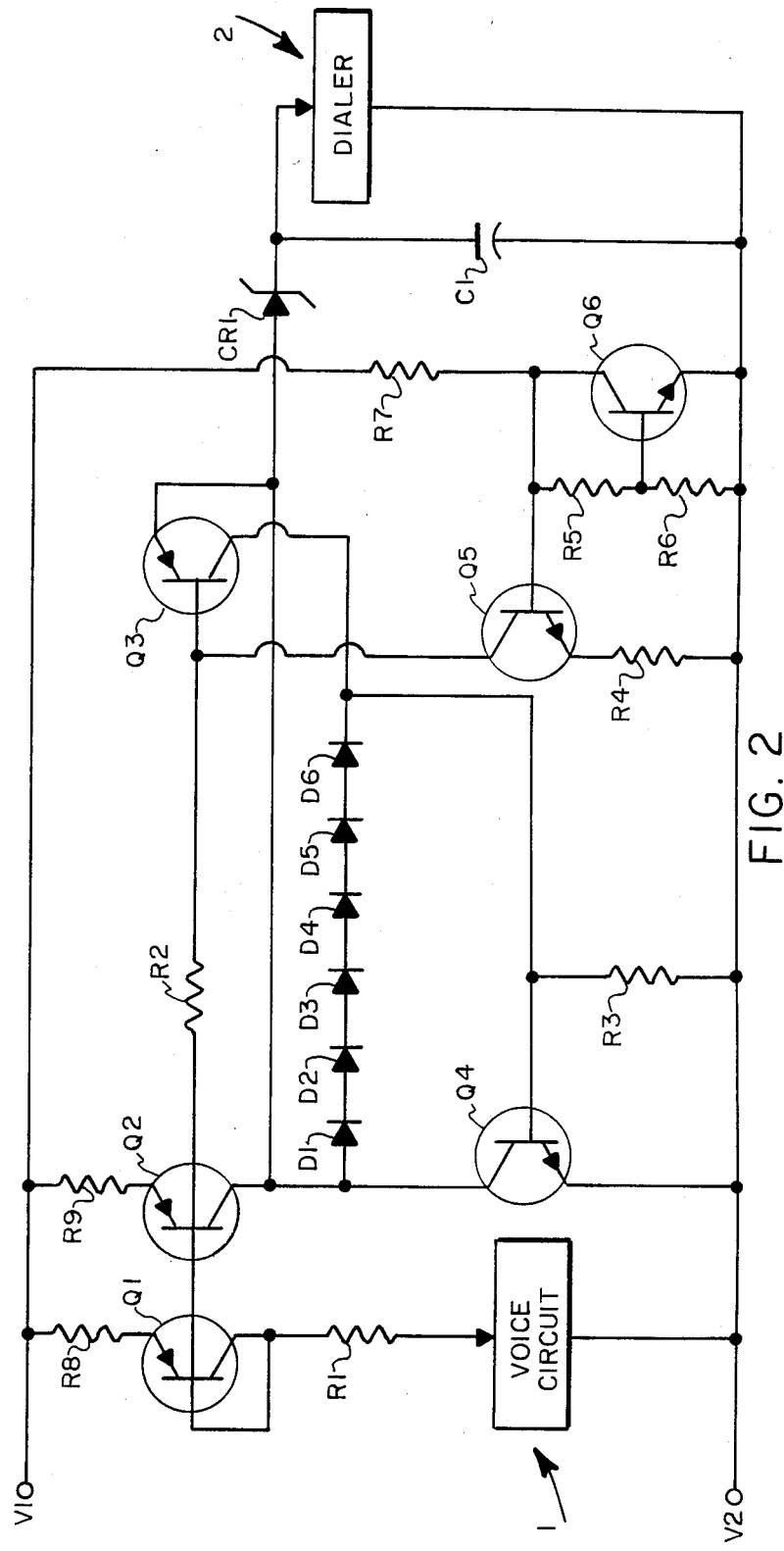
FIG. 2 represents an elevation of the prior bushing in use.
Figure 1:
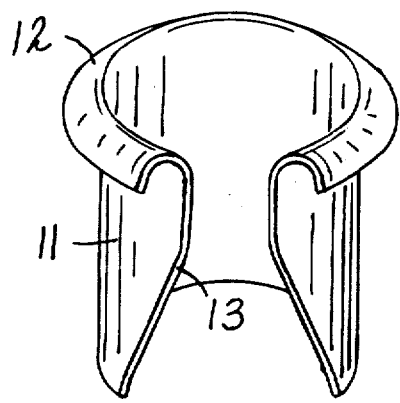
Figure 2:
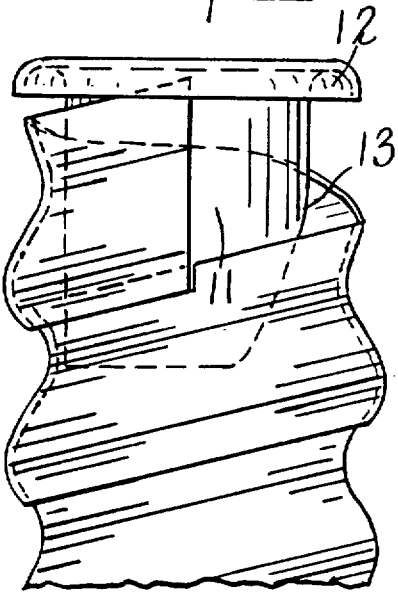

Referring to the drawing, a type of protective covering (bushing) now in use for the cut end of a BX cable is shown in FIGS. 1 and 2 as comprising a cylindrical body portion 11 and an outwardly turned rim 12. The bushing is made of a stiff but slightly elastomeric material and the body wall is cut away, as indicated at 13, so that it can be compressed to fit small sizes of cable or permitted to expand for larger sizes. In either case the rim 12 overlies the cut edge of the cable, whatever its shape and condition, so that the wires in the cable armor receive some protection, but the bushings currently in use are light weight and easily displaced. Frequent inspections and replacements are required in many situations.

Figure 3:
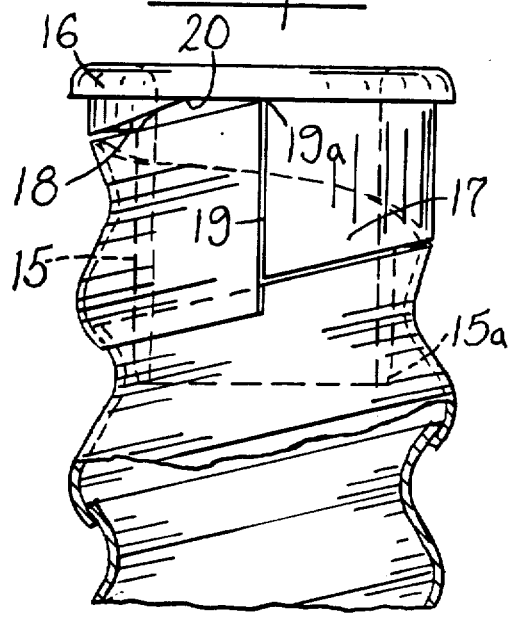
FIG. 3 represents an elevation of the new bushing in use at the end of a "parallel cut" armored cable, parts being broken away.

The bushing according to the invention, shown in FIGS. 3 to 10, comprises a cylindrical body portion 15 and integral molded rim portion 16 which, in one embodiment, is annular as shown in FIGS. 3 to 6. Beneath the rim 16 is the helical flange 17, which may have an outer diameter somewhat smaller than that of the rim, and a downwardly facing flat surface 18 lying at a pitch corresponding to the normal pitch of the convolutions in the armor of a BX cable (as shown in FIG. 3). The flange 17 is terminated at one end by the axially disposed wall 19 and at the other end by a line merger into the under surface of the rim, at a point 20 which may correspond to the upper edge 19a of the wall 19 or may be spaced therefrom. Tubular body portion 15 has a substantially straight and smooth outer surface extending below the lowermost portion of flange surface 18, and the bottom edge 15a of the body portion 15 is preferably beveled, to facilitate introduction of the bushing into the cut end of the cable armor, between the insulated wire and the armor.

Standard armored BX cable is made in a range of slightly varying sizes (inside and outside diameters) provided with 2, 3, 4 or more insulated conductive wires. At points where the armor is cut away to expose the wires, for any purpose, the space between the insulated wires and the inner wall of the armor is usually minimal, so that some effort must be expended to force a bushing, threaded over the exposed wires, into that cut end of the armor. The bushing should, accordingly, be made of a relatively stiff and durable plastic material, such, for instance, as nylon.

Figure 4:
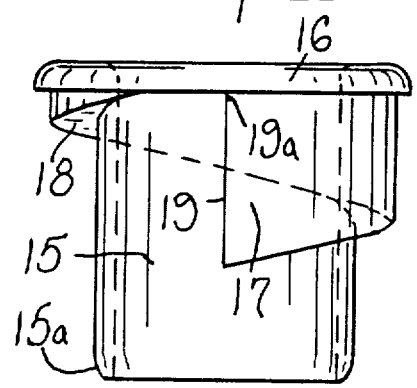
FIG. 4 represents an elevation of the bushing alone.
Figure 5:
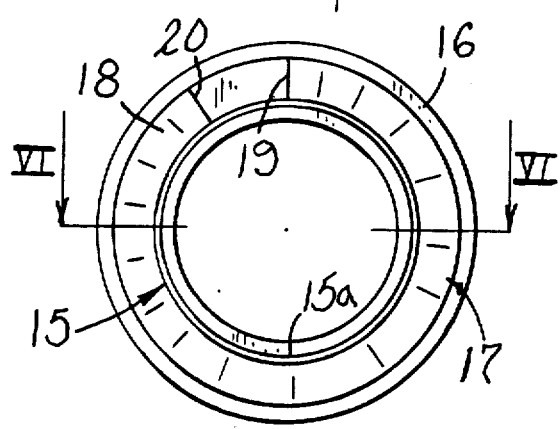
FIG. 5 represents an inner end view of the bushing.
Figure 6:
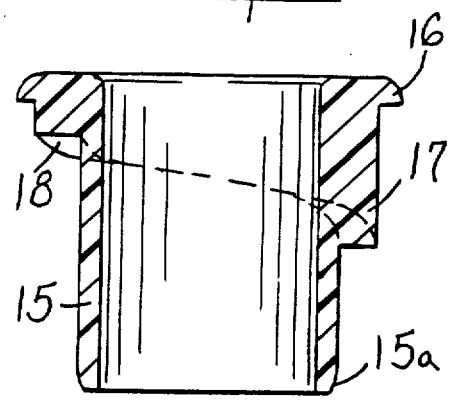
FIG. 6 represents an axial section of the bushing on the line VI—VI of FIG. 5.
Figure 7:
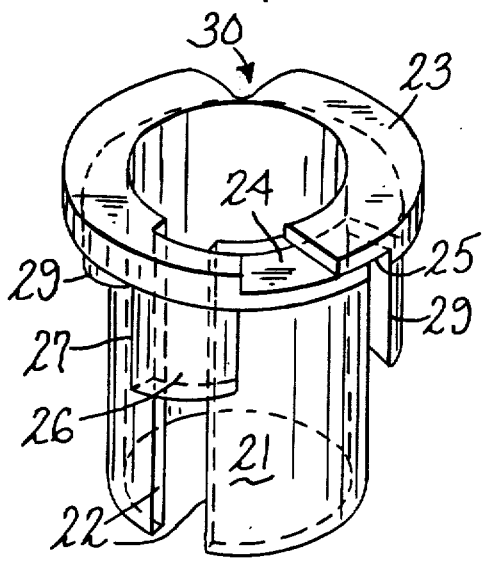
FIG. 7 represents an orthographic projection of a modified form of bushing.
Figure 9:
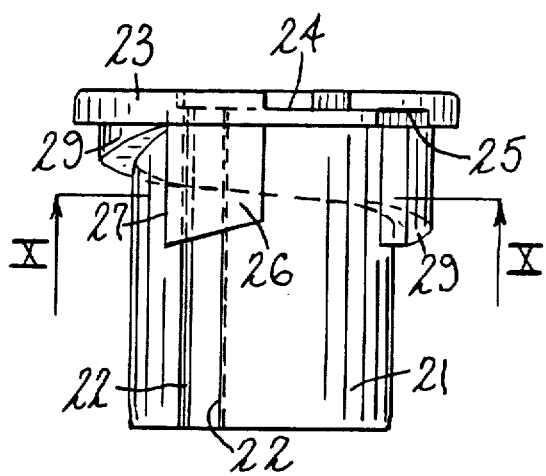
FIG. 9 represents an elevation of the bushing shown in FIG. 7.
Figure 8:
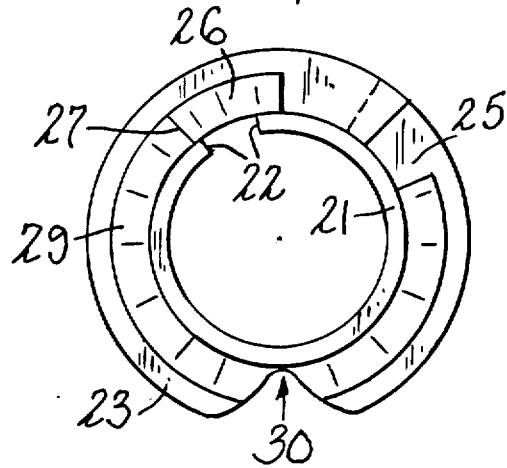
FIG. 8 represents a bottom plan view of the bushing shown in FIG. 7.
Figure 10:
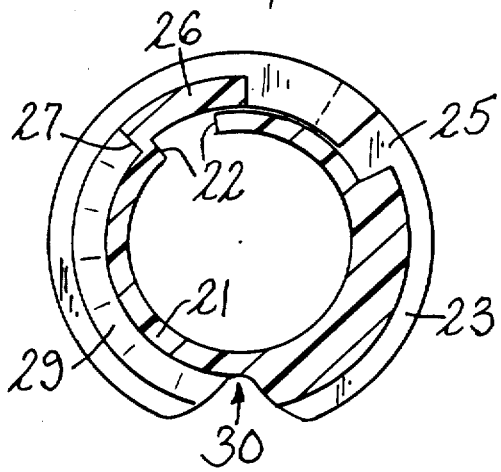
FIG. 10 represents a sectional view taken on the line X—X of FIG. 9.

While annular bushings of the type shown in FIGS. 3 to 6 can be made in a small range of standard sizes to fill most practical needs, the improved bushing can also be made in an adjustable form, as shown in FIGS. 7 to 10. In this embodiment the body portion 21 is cut axially to form edges 22, which may or may not overlap, while the annular rim 23 is cut radially with the material adjacent one edge omitted to form an upwardly facing step 24 which bears against a matching downwardly facing step 25 beneath the end portion of the rim adjacent the other side of the cut. A stop element 26 is formed integrally on the outer surface of the body portion and presents an axially extending and circumferentially facing wall 27 (like the wall 19 in FIG. 4), proportioned to fit against the cut end of a BX cable convolution, as in FIG. 3. A raised flange 29, like the flange 17 in FIG. 4, is integral with the body portion and extends around the body portion from the top of the stop wall 27 to a point at least 270° from its beginning.

Flexibility which permits some contraction and expansion of the bushing, to fit in cable armor of varying diameters, is ensured by the provision of a hinge zone 30, diagonally opposite the steps 24, 25, where the rim 23 is reduced in size. The cylindrical inner surface of the bushing, which bears protectively against the insulated wires, extends at all points beyond any sharp edges or points of the cut cable armor.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limited sense.

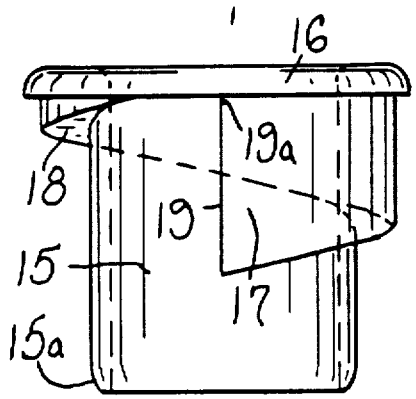

What I claim is:

1. A protective bushing for wires projecting from an armored cable end having a helical edge portion and an edge portion parallel to the cable longitudinal axis, said bushing comprising a cylindrical tubular body portion adapted to be fitted within said end of said cable between the armor and said wires, a radially outwardly projecting rim at an upper end of said body portion, and a raised flange integral with said body and rim and extending at least partially circumferentially around the body portion, said flange having a lower surface adapted to rest against said helical edge portion of the armored cable end when said body portion is fitted within said cable end.

2. A protective bushing according to claim 1 wherein the raised flange is bounded, in the axial direction, on the upper end by the outwardly projecting rim and on the lower end by a flat surface lying at a pitch corresponding to the normal pitch of the convolutions of an armored cable.

3. A protective bushing according to claim 1 wherein the raised flange is bounded on the lower end by an axially disposed wall adapted to rest against said parallel edge portion of the armored cable end when said body portion is fitted within said cable end.

4. A protective bushing according to claim 3 wherein said tubular body portion has a substantially straight and smooth outer surface extending below the lowermost portion of said flange lower surface adapted to be fitted within said cable end.

5. A protective bushing according to claim 1 wherein the body portion is cut axially to form substantially parallel cut edges and the rim is cut radially, the material adjacent said cuts being formed to constitute an overlapping joint, wherein the bushing may be contracted and expanded to fit cable ends of different sizes.

6. A protective bushing according to claim 5 wherein said rim includes a hinge zone having a reduced portion opposite said overlapping joint to facilitate contraction and expansion of said bushing.

7. A protective bushing for wires projecting from an armored cable end having a helical edge portion and an edge portion parallel to the cable longitudinal axis, said bushing comprising a cylindrical tubular body portion adapted to be fitted within said end of said cable between the armor and said wires and a raised flange integral with the upper end of said tubular body and extending at least partially circumferentially around the body portion, said raised flange having at a lower end an axially disposed wall adapted to rest against said parallel edge portion of the armored cable end and a flat surface lying at a pitch corresponding to the normal pitch of the convolutions of the armored cable and adapted to rest against said helical edge portion of the armored cable end when said body portion is fitted within said cable end.

8. A protective bushing according to claim 7 further including a radially outwardly projecting rim forming the upper bound of said flange and integral with said body and flange.

9. A protective bushing according to claim 8 wherein the body portion is cut axially to form substantially parallel cut edges and the rim is cut radially, the material adjacent said cuts being formed to constitute an overlapping joint, wherein the bushing may be contracted and expanded to fit cable ends of different sizes.

10. A protective bushing according to claim 9 wherein said rim includes a hinge zone having a reduced portion opposite said overlapping joint to facilitate contraction and expansion of said bushing.

11. A protective bushing for wires projecting from an armored cable end having a helical edge portion and an edge portion parallel to the cable longitudinal axis, said bushing comprising a cylindrical tubular body portion and a raised flange integral with the upper end of said tubular body and extending at least partially circumferentially around the body portion, said flange having at a lower end an axially disposed wall adapted to rest against said parallel edge portion of the armored cable end and a flat surface lying at a pitch corresponding to the normal pitch of the convolutions of the armored cable and adapted to rest against said helical edge portion of the armored cable end, said tubular body portion having a substantially straight and smooth outer surface extending below the lowermost portion of said flange lower end adapted to be fitted within said end of said cable between the armor and the wires.

12. A protective bushing according to claim 11 further including a radially outwardly projecting rim forming the upper bound of said flange and integral with said body and flange.

13. A protective bushing according to claim 12 wherein the body portion is cut axially to form substantially parallel cut edges and the rim is cut radially, the material adjacent said cuts being formed to constitute an overlapping joint, wherein the bushing may be contracted and expanded to fit cable ends of different sizes.

14. A protective bushing according to claim 13 wherein said rim includes a hinge zone having a reduced portion opposite said overlapping joint to facilitate contraction and expansion of said bushing.

* * * * *

UNITED STATES PATENT AND TRADEMARK OFFICE
CERTIFICATE OF CORRECTION

PATENT NO.  : 4,683,350                                Page 1 of 4
DATED       : July 28, 1987
INVENTOR(S) : Lucien C. Ducret It is certified that error appears in the above-identified patent and that said Letters Patent are hereby corrected as shown below:

The Title Page should be deleted to appear as per attached Title Page:

In the Drawings:

Delete Figs. 1 and 2 and substitute Figs. 1 through 10 as shown on the attached sheets.

Signed and Sealed this

Fifteenth Day of December, 1987

Attest:

DONALD J. QUIGG

Attesting Officer         Commissioner of Patents and Trademarks

United States Patent
Ducret

[11] Patent Number: 4,683,350
[45] Date of Patent: Jul. 28, 1987

[54] BUSHING FOR BX CABLE

[76] Inventor: Lucien C. Ducret, 9 Tod's Driftway, Old Greenwich, Conn. 06870

[21] Appl. No.: 922,061

[22] Filed: Oct. 22, 1986

[51] Int. Cl.⁴ .............................................. H01B 17/58
[52] U.S. Cl. .............................................. 174/83; 16/2
[58] Field of Search ............... 174/83, 152 G, 153 G; 16/2, 3, 108; 138/96 R, 96 T

[56] References Cited

U.S. PATENT DOCUMENTS

| 947,185 | 1/1910 | McBean | 174/153 G |
| 1,808,542 | 6/1931 | Ginsburg | 174/83 |
| 1,842,216 | 1/1932 | Thomas, Jr. | 174/83 X |

Primary Examiner—Laramie E. Askin
Attorney, Agent, or Firm—DeLio & Associates

[57] ABSTRACT

A protective bushing adapted to fit in a cut end of armored cable of the BX type, shaped and contoured to prevent contact of wires in the cable with any sharp edges or points adjacent to the cut end of the armor.

14 Claims, 10 Drawing Figures